J. C. BOYLE.
CLUTCH FOR AUTOMOBILE STARTING DEVICES.
APPLICATION FILED MAY 17, 1911.
1,009,219.
Patented Nov. 21, 1911.
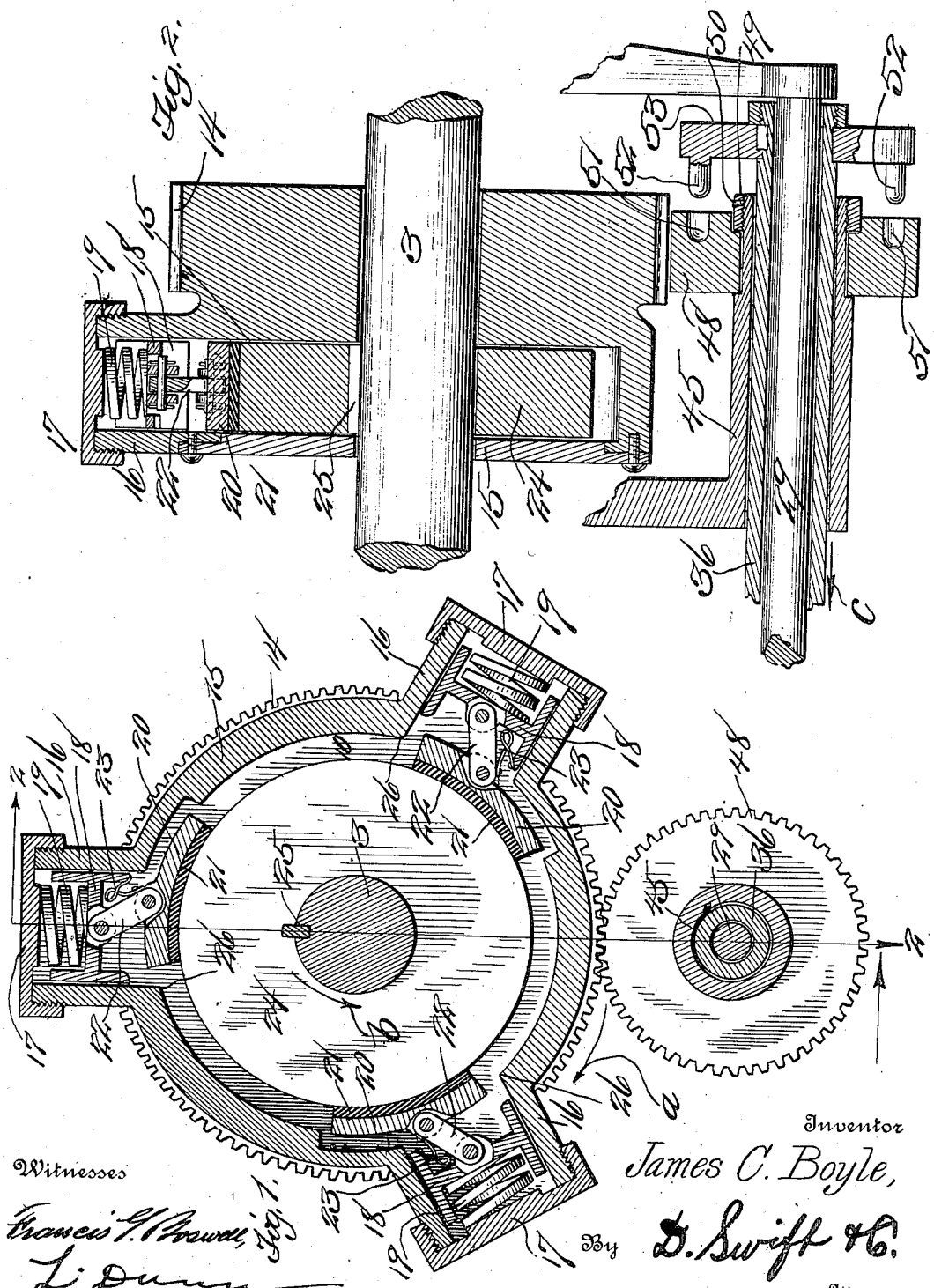
Witnesses
Inventor
James C. Boyle,
By D. Swift &Co.
Attorney

UNITED STATES PATENT OFFICE.

JAMES C. BOYLE, OF CALGARY, ALBERTA, CANADA.

CLUTCH FOR AUTOMOBILE STARTING DEVICES.

1,009,219.  Specification of Letters Patent.  Patented Nov. 21, 1911.

Original application filed February 11, 1911, Serial No. 608,046. Divided and this application filed May 17, 1911. Serial No. 627,825.

*To all whom it may concern:*

Be it known that I, JAMES C. BOYLE, a subject of the King of Great Britain, residing at Calgary, Alberta, Canada, have invented a new and useful Clutch for Automobile Starting Devices; and I do hereby declare the following to be a full, clear, and exact description of the invention, such as will enable others skilled in the art to which it appertains to make and use the same.

This invention relates to a new and useful clutch mechanism, adapted mainly for use in connection with starting mechanisms for explosive engines of automobiles, for instance a starting mechanism, similar to that shown, described and claimed in a separate application, filed Feb. 11, 1911, Ser. No. 608,046, from which the present clutch was divided.

The invention in its broadest scope aims as its principal object, to embody a clutch mechanism (which also constitutes a safety device), for driven shafts, especially engine shafts.

A further object of the invention is to provide a spur gear adapted to be loosely journaled upon a shaft to be rotated, in combination with a casing integral with the gear having radially outwardly projecting boxings, with spring tensioned cross heads slidable in the boxings, which co-act with clutch members including fiber shoes which frictionally engage an annular member keyed to the shaft and mounted within the casing.

In the present invention, power is first imparted to the gear, and then by the clutch members and annular member the power is transmitted to the shaft. But it is to be understood that power may first be imparted to the shaft and then to the gear by the co-action of the clutch member and shoes and the annular member. If power is first imparted to the gear, the same is moved in the direction of the arrow $a$, but if power is imparted to the shaft first, the same is rotated in the direction of the arrow $b$.

It is to be understood that this clutch device may not only be used in connection with automobile starting mechanisms, but may be employed in connection with any and all machinery to which it is applicable.

In the drawings, there is only disclosed one form of the invention, but in practical fields, this form may require alterations, to which the applicant is entitled, provided the alterations are comprehended within the scope of what is claimed.

The invention comprises further features and combination of parts, as hereinafter set forth, shown in the drawings, and claimed.

In the drawings Figure 1 is a vertical sectional view through the clutch mechanism. Fig. 2 is a sectional view on line 2—2 of Fig. 1.

Referring more especially to the accompanying drawings, 3 designates a shaft, from which or to which power may be transmitted. Upon this shaft is arranged a clutch mechanism 10, which includes a spur gear 14, which is loosely mounted upon the shaft 3. In the present application power is to be first imparted to the loosely mounted gear, and then to the shaft 3. To first impart motion to the gear 13, a sleeve 36 is journaled upon a shaft 29, which is journaled in bearings of any suitable machine frame (not shown). Power is transmitted to the shaft 29, and then to the sleeve 36, by any suitable means (not shown). When power is thus transmitted, a sliding action is imparted to the sleeve 36 in the direction of the arrow $c$ by any suitable means (not shown), so that the lugs 52 of the disk 53, which is keyed to the sleeve 36, will engage the depressions or recesses 51 of the gear 48, in order to cause the gear 48 to rotate with the sleeve 36. Upon an observation of the drawings, it will be seen, that the gear 48 meshes with the gear 14, in which case motion will be imparted to the gear 14, when the gear 48 is clutched to rotate with the sleeve 36. The gear 48 is loosely journaled upon a hollow arm 45, which projects from any suitable machine frame (not shown) A collar 49 (which is threaded upon the arm 45, and prevented from unscrewing by the threaded pin 50) holds the gear 48 upon the arm, in the manner shown in Fig. 2.

Integral with the gear 14 is a casing 15. This casing is provided with a plurality of radially projecting boxings 16 having caps threaded thereon. The walls of the boxings 16 are rectangular, and mounted within the boxing are radially slidable spring tensioned crossheads 18. The springs 19 are arranged between the cross heads and the caps 17. Connecting the cross heads 18 and the clutch members 20 (which are supplied with fiber friction clutch shoes 21) are the links 22. Arranged between the links and portions of the cross heads are springs 23, which are designed for the purpose of holding the clutch members 20 adjacent the clutch disk 24, which is keyed to rotate with the shaft 3, as shown at 25. If there is any tendency of the clutch members feeding backwardly the portions 26 of the casing 15 will act as stops for the clutch members. However, after motion has been imparted to the clutch disk 24 and the shaft 3 sufficiently to start an engine or other machinery (not shown), the clutch members will automatically release from engagement with the clutch disk 24. When the gear 14 is rotated in the direction of the arrow $a$, the fiber clutch shoes 21 of the clutch members 20 will frictionally bind against the annular member 24, and thus rotate the shaft 3. When the clutch members 20 thus operate, the cross heads are moved in the boxings 16 against the tension of the springs 19. When the shaft 3 is first rotated in the direction of the arrow $b$, there is a close frictional contact between the annular member 24 and the clutch members 20, thus causing the gear 14 to rotate with the shaft 3.

From the foregoing, it will be clearly manifest that there has been devised a novel, efficient, simple and practical clutch mechanism, adapted principally for use in connection with automobile starting mechanisms.

The invention having been set forth, what is claimed as new and useful, is:

1. In a clutch mechanism, a shaft, an annular member keyed to the shaft, a revoluble element loosely journaled on the shaft and provided with a casing surrounding the annular member, the casing having a plurality of outwardly radially projecting boxings, spring tensioned cross heads slidable therein, clutch members having fiber clutch shoes and provided with link connections with the cross heads to engage the annular member, when the revoluble element is revolved.

2. In a clutch mechanism, a shaft, an annular member keyed to the shaft, a revoluble element loosely journaled on the shaft and provided with a casing surrounding the annular member, the casing having a plurality of outwardly radially projecting boxings provided with caps, cross heads slidably movable in the boxings, springs arranged between the cross heads and the caps, clutch members having fiber clutch shoes arranged in the casing and concentric with the center thereof for frictional engagement with the annular member and provided with link connections with the cross heads, means arranged between portions of the cross heads and the links for holding the clutch members steadily in engagement with the annular member, the casing having portions constituting abutment means for limiting the retrogression of the clutch members.

3. In a clutch mechanism, a shaft, an annular member keyed to the shaft, a revoluble element loosely journaled on the shaft and provided with a casing surrounding the annular member, the casing having a plurality of outwardly radially projecting boxings, spring tensioned cross heads slidable therein, clutch members having fiber clutch shoes and provided with link connections with the cross heads to engage the annular member, when the revoluble element is revolved, and means arranged between portions of the cross heads and the links for holding the clutch members steadily in engagement with the annular member.

4. In a clutch mechanism, a revoluble shaft, having an annular member keyed thereto, a rotatable element journaled loosely on the shaft and adapted to rotate a sleeve with a shaft telescoping therein, the element having a casing surrounding the annular member, the casing having a plurality of outwardly radially projecting boxings, cross heads slidable therein, yielding means between the cross heads and portions of the boxing, clutch members provided with link connections with the cross heads to be engaged by the annular member when the shaft is revolved for imparting motion to the element, the casing having portions constituting abutment means for limiting the retrogression of the clutch members.

In testimony whereof I have signed my name to this specification in the presence of two subscribing witnesses.

JAMES C. BOYLE.

Witnesses:
GEORGE PARKER,
F. S. ALBRIGHT.

---

Copies of this patent may be obtained for five cents each, by addressing the "Commissioner of Patents. Washington, D. C."